(12) United States Patent
Gonzalez et al.

(10) Patent No.: US 11,698,076 B2
(45) Date of Patent: Jul. 11, 2023

(54) REFRIGERANT COMPRESSOR INCLUDING INSULATION FOR MAGNETIC BEARING ASSEMBLY

(71) Applicant: Danfoss A/S, Nordborg (DK)

(72) Inventors: Delvis Anibal Gonzalez, Tallahassee, FL (US); Lin Xiang Sun, Tallahassee, FL (US)

(73) Assignee: Danfoss A/S

( * ) Notice: Subject to any disclaimer, the term of this patent is extended or adjusted under 35 U.S.C. 154(b) by 0 days.

(21) Appl. No.: 17/574,606

(22) Filed: Jan. 13, 2022

(65) Prior Publication Data

US 2022/0260082 A1 Aug. 18, 2022

Related U.S. Application Data

(60) Provisional application No. 63/149,406, filed on Feb. 15, 2021.

(51) Int. Cl.
| | |
|---|---|
| *F04D 25/06* | (2006.01) |
| *F04D 29/048* | (2006.01) |
| *H02K 7/09* | (2006.01) |
| *F16C 32/04* | (2006.01) |

(52) U.S. Cl.
CPC .......... *F04D 25/06* (2013.01); *F04D 29/048* (2013.01); *F16C 32/048* (2013.01); *H02K 7/09* (2013.01)

(58) Field of Classification Search
CPC ........ H02K 7/09; H02K 15/10; H02K 15/105; F16C 32/044; F16C 32/047; F04D 29/048; F04D 29/058
See application file for complete search history.

(56) References Cited

U.S. PATENT DOCUMENTS

| | | | |
|---|---|---|---|
| 2018/0097421 A1* | 4/2018 | Abe | H02K 3/32 |
| 2020/0303984 A1* | 9/2020 | Coldwate | H02K 1/146 |

FOREIGN PATENT DOCUMENTS

| | | | | |
|---|---|---|---|---|
| WO | WO-2012015398 A1 * | 2/2012 | | F04D 13/0633 |

* cited by examiner

*Primary Examiner* — Kenneth J Hansen
(74) *Attorney, Agent, or Firm* — Carlson, Gaskey & Olds, P.C.

(57) ABSTRACT

A refrigerant compressor includes a magnetic bearing assembly including insulation for the coils and lamination stack of the assembly. The lamination stack includes coil apertures extending axially between opposed axial faces. An insert partially extends into a first coil aperture to prevent direct contact between first and second coils. The insert includes a first leg extending into a slot formed in the lamination stack and a second leg radially spaced-apart from the first leg with the second leg extending axially into the first coil aperture. An annular cover having first and second legs extends into respective slots and apertures of the lamination stack. A second annular cover is provided on the opposite face of the coils that is connected to free ends of the second legs. The lamination stack and coils are coated with an insulative material such as epoxy.

13 Claims, 7 Drawing Sheets

REFRIGERANT COMPRESSOR INCLUDING INSULATION FOR MAGNETIC BEARING ASSEMBLY

RELATED APPLICATION(S)

This application claims the benefit of U.S. Provisional Application No. 63/149,406, filed Feb. 15, 2021, the entirety of which is herein incorporated by reference.

BACKGROUND

Some refrigerant compressors include a magnetic bearing assembly including one or more magnetic bearings that radially and/or axially support a shaft. The shaft supports an impeller that is driven by an electric motor. In one type of magnetic bearing assembly, coils are wrapped relative to a lamination stack. The coils are insulated from one another and from the stack. Typically, discrete insulating sheets, like sheets of NOMEX® paper, are cut to a desired size and shape and are placed on the stack and between the coils.

SUMMARY

In some aspects, the techniques described herein relate to a refrigerant compressor including: an electric motor configured to rotationally drive an impeller via a shaft; and a radial magnetic bearing assembly including a lamination stack coated with an insulative material.

In some aspects, the techniques described herein relate to a refrigerant compressor, wherein: the lamination stack includes coil apertures extending axially between opposed axial faces of the lamination stack, and a plurality of coils pass through the coil apertures between the opposed axial faces.

In some aspects, the techniques described herein relate to a refrigerant compressor, wherein an insert at least partially extends into a first coil aperture to prevent direct contact between first and second coils.

In some aspects, the techniques described herein relate to a refrigerant compressor, wherein the insert is made of an electrically insulative material.

In some aspects, the techniques described herein relate to a refrigerant compressor, wherein: the insert includes a first leg extending into a slot formed in the lamination stack, the insert includes a second leg radially spaced-apart from the first leg, and the second leg extends axially into the first coil aperture and is sized and shaped so as to prevent direct contact between the first and second coils within the first coil aperture.

In some aspects, the techniques described herein relate to a refrigerant compressor, wherein an annular cover is arranged against an axial face of the coils.

In some aspects, the techniques described herein relate to a refrigerant compressor, wherein the annular cover radially overlaps the coils.

In some aspects, the techniques described herein relate to a refrigerant compressor, wherein the annular cover includes: a first leg radially extending into a slot formed in the lamination stack, and a second leg radially spaced-apart from the first leg and extending axially into a first coil aperture, wherein the second leg is sized and shaped so as to prevent direct contact between first and second coils within the first coil aperture.

In some aspects, the techniques described herein relate to a refrigerant compressor, further including another annular cover arranged against an opposite axial face of the coils as the annular cover, and wherein the other annular cover is connected to free ends of the first and second legs.

In some aspects, the techniques described herein relate to a refrigerant compressor, wherein the annular cover is made of an epoxy material.

In some aspects, the techniques described herein relate to a refrigerant compressor, wherein the coils are coated with an epoxy material.

In some aspects, the techniques described herein relate to a refrigerant compressor, wherein the insulative material is an epoxy material coating the lamination stack.

In some aspects, the techniques described herein relate to a refrigerant compressor including: an electric motor configured to rotationally drive an impeller via a shaft; and a radial magnetic bearing assembly including a lamination stack having a plurality of apertures, and wherein an insert at least partially extends into a first one of the apertures to prevent direct contact between first and second coils within the first aperture.

In some aspects, the techniques described herein relate to a refrigerant compressor, wherein the insert is made of an electrically insulative material.

In some aspects, the techniques described herein relate to a refrigerant compressor, wherein: the insert includes a first leg extending into a slot formed in the lamination stack, the insert includes a second leg radially spaced-apart from the first leg, and the second leg extends axially into the first aperture and is sized and shaped so as to prevent contact between the first and second coils within the first aperture.

In some aspects, the techniques described herein relate to a refrigerant compressor, wherein: the first and second legs project from a first annular cover, the first annular cover radially overlaps a first axial end of the first and second coils, a second annular cover is connected to free ends of the first and second legs, and the second annular cover radially overlaps a second axial end of the first and second coils.

In some aspects, the techniques described herein relate to a refrigerant compressor, wherein the lamination stack is coated with an epoxy material.

In some aspects, the techniques described herein relate to a refrigerant compressor including: an electric motor configured to rotationally drive an impeller via a shaft; and a radial magnetic bearing assembly including a lamination stack and a plurality of coils arranged relative to the stack, and wherein an annular cover covers an axial face of the coils.

In some aspects, the techniques described herein relate to a refrigerant compressor, wherein the annular cover includes: a first leg configured to extend into a slot formed in the lamination stack, and a second leg radially spaced-apart from the first leg and configured to extend axially into a coil aperture of the lamination stack, wherein the second leg is sized and shaped so as to prevent contact between adjacent coils within the coil aperture.

In some aspects, the techniques described herein relate to a refrigerant compressor, further including another annular cover covering an opposite axial face of the coils as the annular cover, and wherein the other annular cover is connected to free ends of the first and second legs.

DETAILED DESCRIPTION

This disclosure relates to a refrigerant compressor including a magnetic bearing assembly, and more particularly, to insulation for use in connection with the magnetic bearing assembly.

Figure 1:
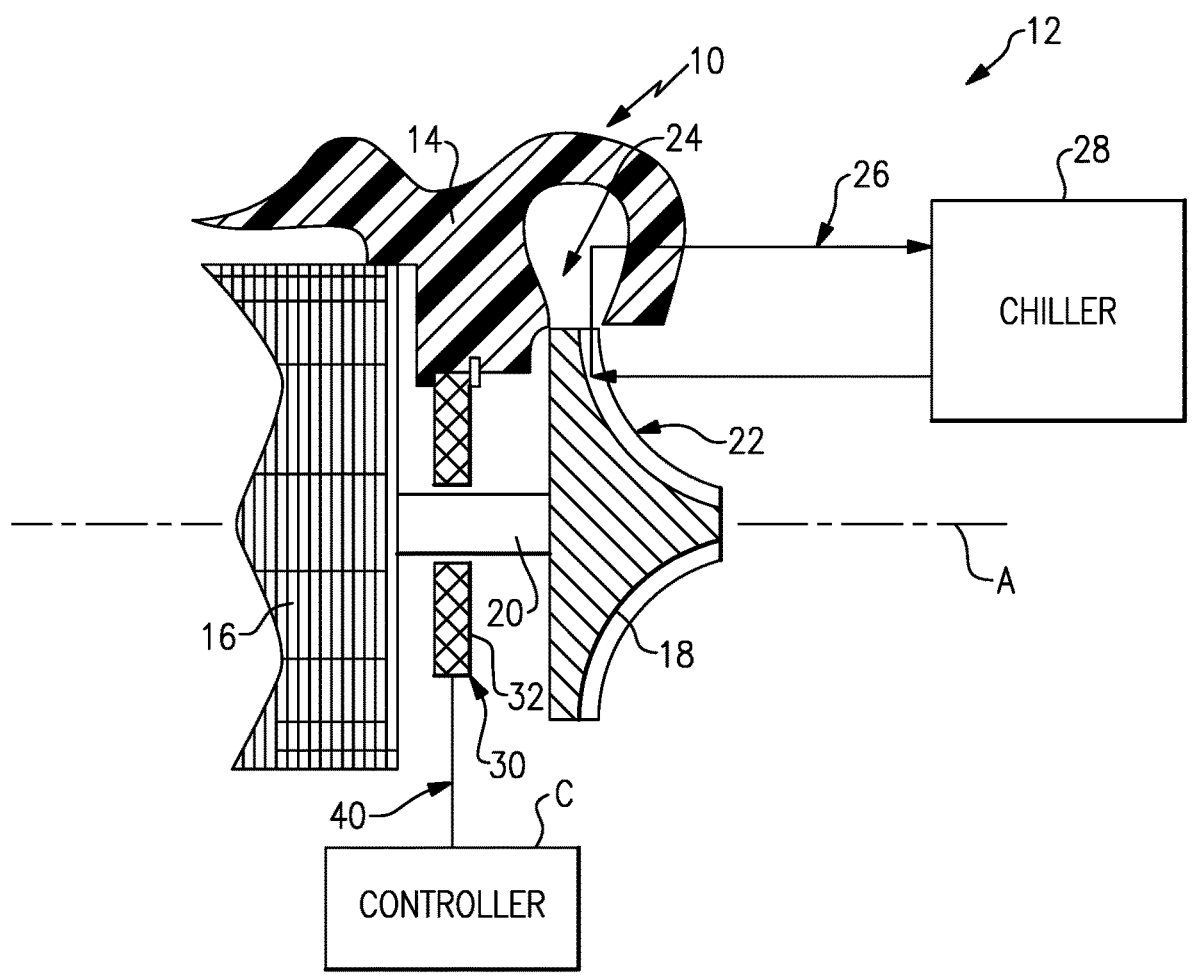
FIG. 1 is a highly schematic view of a refrigerant system having a refrigerant compressor with a magnetic bearing assembly.

Referring to FIG. 1, a refrigeration system 12 includes a refrigerant compressor 10 for circulating a refrigerant. The refrigerant compressor 10 includes a housing 14 within which an electric motor 16 is arranged. The electric motor 16 rotationally drives an impeller 18 via a shaft 20 to pump the refrigerant.

The impeller 18 includes an inlet 22 and an outlet 24 in fluid communication with a refrigerant loop 26 that circulates the refrigerant to a load, such as a chiller 28. The refrigerant loop 26 also includes a condenser, an evaporator, and an expansion device (not shown).

The shaft 20 is rotationally supported relative to the housing 14 by a magnetic bearing assembly 30. The magnetic bearing assembly 30 includes a radial magnetic bearing 32 in this example. The magnetic bearing assembly 30 may also include additional magnetic bearings, such as additional radial magnetic bearings and/or additional axial magnetic bearings.

A controller C communicates with the magnetic bearing assembly 30 to energize the magnetic bearing assembly 30 thereby creating a magnetic field supporting the shaft 20, and to control the characteristics of the magnetic bearing assembly 30 and the shaft 20 during operation of the refrigerant compressor 10.

Figure 2:
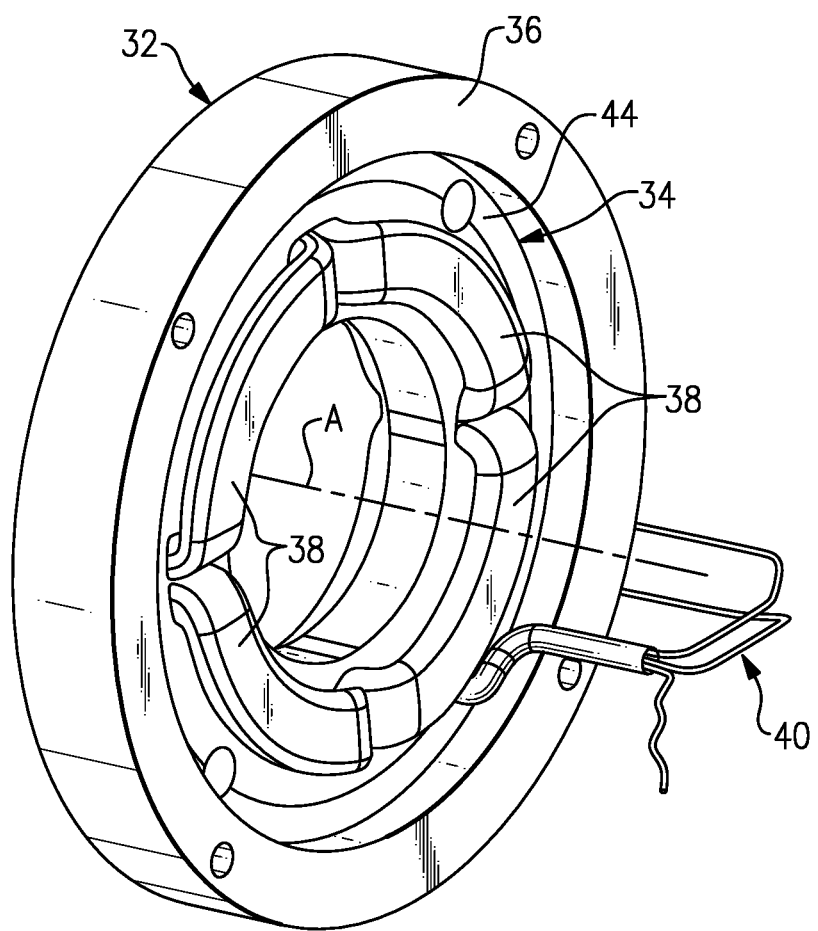
FIG. 2 is a perspective view of an example radial magnetic bearing.

Additional detail of the radial magnetic bearing 32 is shown in FIG. 2. The radial magnetic bearing 32 includes an annular lamination stack 34 supported within a ring 36. The ring 36 is not required in all examples. When present, the ring 36 is mounted in the housing 14 and may be welded to the stack 34. The ring 36 may be mounted in a bearing housing which is then mounted to the housing 14, in some examples. Coils 38 of wire cooperate with the stack 34 to generate a magnetic field in the air gaps between the stack 34 and the shaft 20. In the example, four circumferentially spaced coils 38 are mounted onto the stack 34. Leads 40 electrically connect the coils 38 to the controller C.

Figure 3:
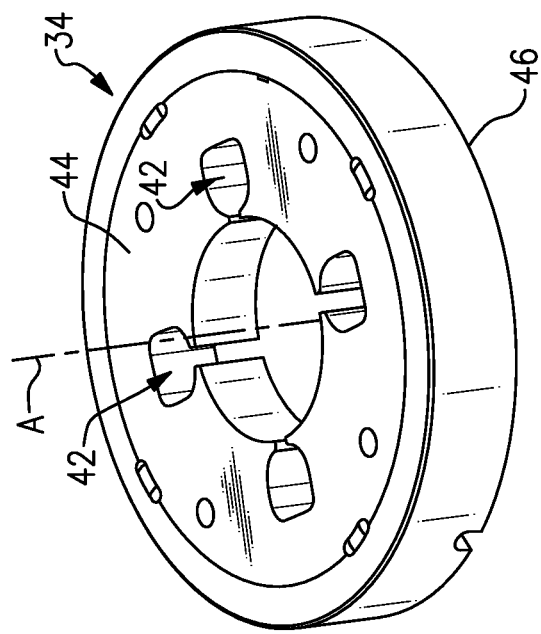
FIG. 3 is a perspective view of a lamination stack.

It is desirable to insulate the coils 38 from one another and from the stack 34 to prevent electrical shorts within the magnetic bearing assembly 30. With reference to FIG. 3, the stack 34 includes coil apertures 42, which may be referred to as slots, that extend axially between opposed axial faces 44, 46 of the stack 34 to permit the coils 38 to pass between the axial faces 44, 46.

Figure 4:
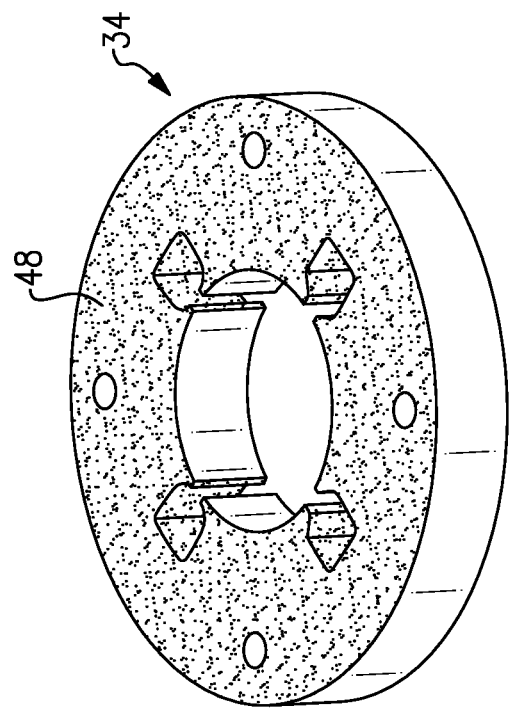
FIG. 4 is a perspective view of the stack of FIG. 3 with a coating applied to the stack.

Rather than use discrete sheets to insulate the coils 38 from the lamination stack 34, the stack 34 is covered with an insulative coating 48, as shown in FIG. 4. The coating 48 may cover the stack 34 on all sides, including within the apertures 42. In an example, the coating 48 does not cover the innermost radial surfaces of the stack 34. The coating 48 may be provided by any electrically insulative material. In an example, the coating 48 is provided by an epoxy material. The coating 48 may initially be a powder, and may be deposited on the stack 34 using known deposition techniques, such as vapor deposition and/or spraying. In another example, the coating 48 is applied using a dipping technique. The coating 48 is not overmolded relative to the stack 34. By depositing, spraying, or dipping the coating 48 onto the stack, the coating 48 is applied less expensively and in a lesser time compared to overmolding.

Figure 5:
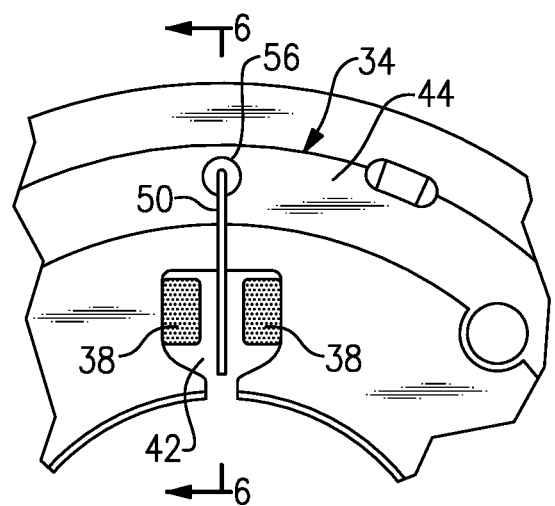
FIG. 5 is an axial end view of an insert installed relative to the stack and extending into a coil aperture.

Additional aspects of this disclosure insulate the coils 38 from one another at locations within the apertures 42, which is a location where the coils 38 may otherwise contact one another. In FIG. 5, an insert 50 is at least partially inserted into the aperture 42 between coils 38. The insert 50 is relatively rigid and is made of an electrically insulative material, in this example. The insert 50 may be a part molded of an epoxy material.

Figure 6:
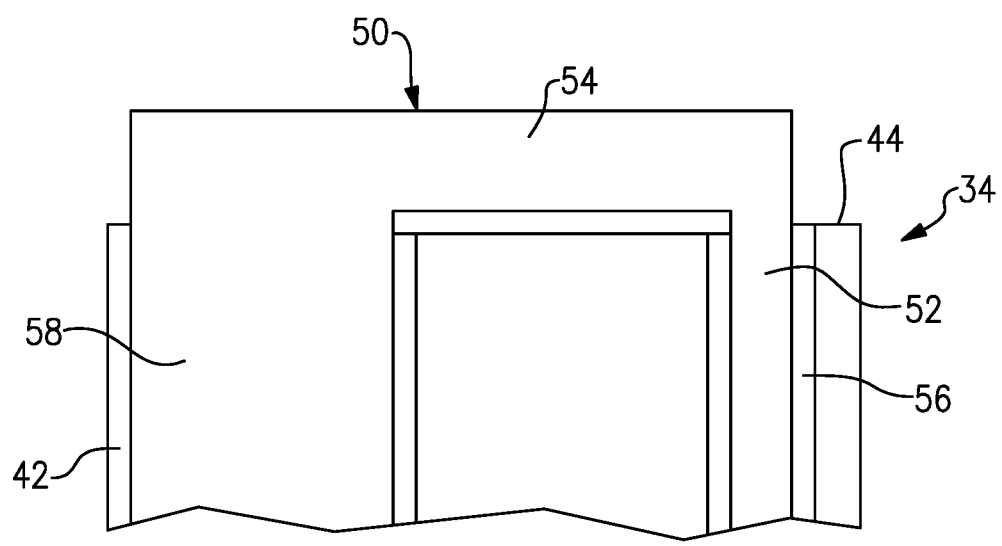
FIG. 6 is a cross-sectional view illustrating the arrangement of the insert relative to the stack and the aperture.

With reference to FIG. 6, the insert 50 includes a first leg 52 radially outward of the aperture 42 and extending axially from a main body 54 of the insert 50 into a slot 56 formed in the stack 34. The slot 56 may be pre-punched into the stack 34 or formed using another technique. The insert 50 further includes a second leg 58 radially spaced-apart from the first leg 52 and extending axially from the main body 54 into the aperture 42. The second leg 58 is sized and shaped so as to prevent direct contact between the coils 38 within the aperture 42. The second leg 58 radially divides the aperture 42 in half, in one example. The first leg 52 and slot 56 are configured to interface with one another to maintain the position of the insert 50 once the insert 50 is installed relative to the stack 34. An insert 50 is inserted into each aperture. The stack 34 includes four inserts 50, in this example.

Figure 7:
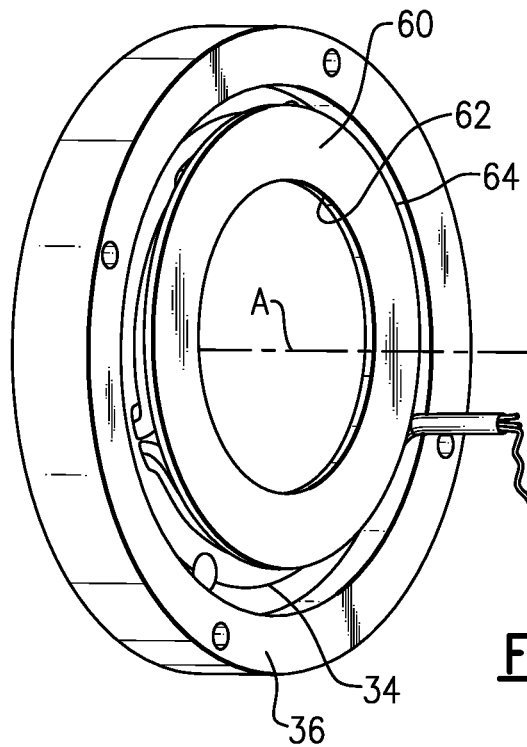
FIG. 7 is a perspective view of a radial magnetic bearing similar to FIG. 2 but with a cover insulating an axial face of the coils.

Another aspect of this disclosure includes covering axial faces of the coils 38. In FIG. 7, an annular cover 60 is arranged adjacent, and in particular against, an axial face of the coils 38 and is centered about the axis A. More specifically, the cover 60 is arranged adjacent an axial face of the coils 38 facing away from the stack 34. The cover 60 is relatively rigid and is made of an electrically insulative material. The cover 60 may be a part molded of epoxy, in an example.

The cover 60 exhibits a radial dimension between inner and outer radial surfaces 62, 64 that radially overlaps the coils 38. Flanges may extend axially between the inner and outer radial surfaces 62, 64 and the stack 34 to further protect the coils 38.

Figure 8:
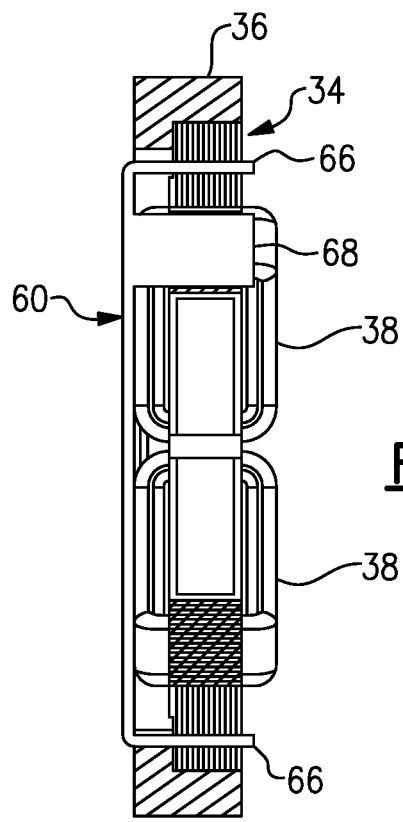
FIG. 8 is side view of the cover of FIG. 7.

The cover 60 can be sized and shaped to cooperate with the inserts 50. Alternatively, as in FIG. 8, the cover 60 may include a plurality of first projections 66 and a plurality of second projections 68 circumferentially disposed about the cover 60. The first projections 66 are sized and shaped similar to the first legs 52 and are configured for receipt into and cooperation with slots 56. The second projections 68 are sized and shaped similar to the second legs 58 and are configured for receipt into the apertures 42 between coils 38.

Figure 9:
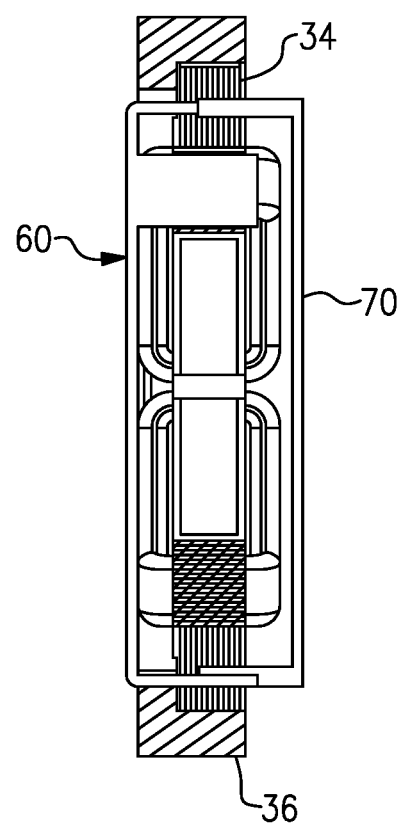
FIG. 9 is a side view of another cover attached to the cover of FIGS. 7 and 8.

In FIG. 9, another cover 70 may be configured to cover an opposite axial face of the coils 38 as the cover 60. The cover 70 may attached to the free ends of the projections 66, as shown in the example of FIG. 9, or attached to the cover 60 in another manner.

Figure 11:
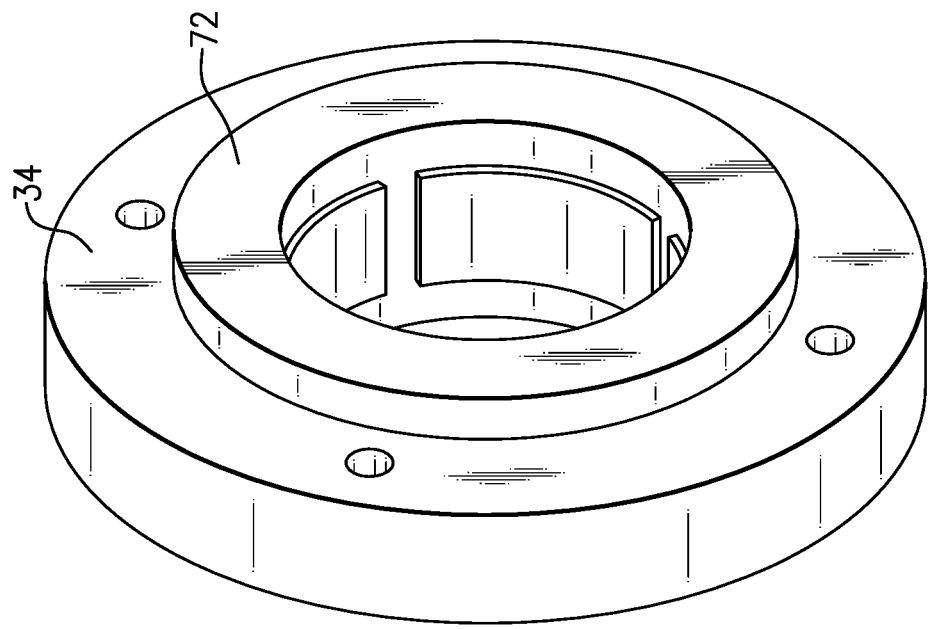
FIG. 11 is a perspective view of the lamination stack with an epoxy covering the coils.
Figure 10:
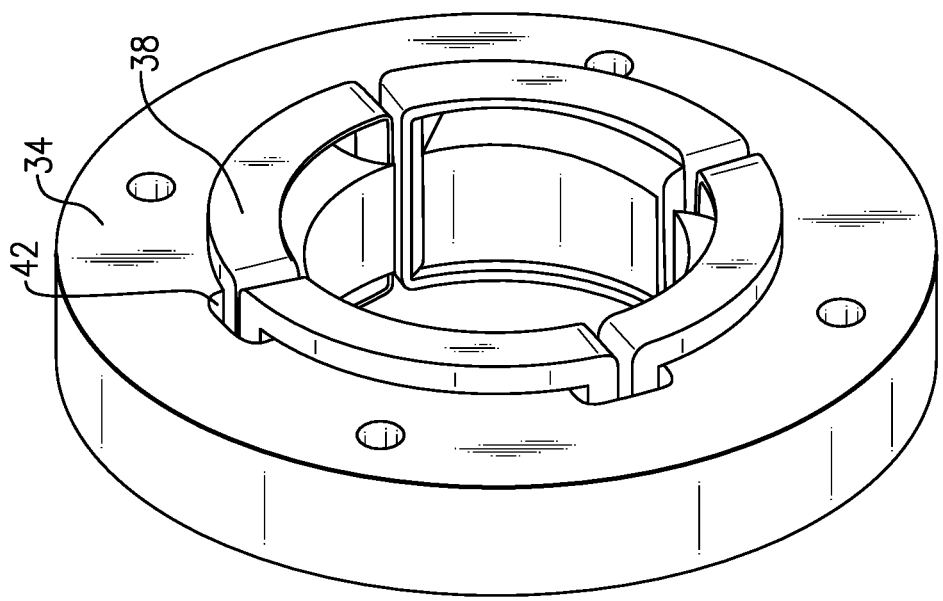
FIG. 10 is a perspective view of a lamination stack with uncovered coils.

With joint reference to FIGS. 10 and 11, an epoxy 72 covers the coils 38. In particular, the epoxy 72 fully encapsulates the coils 38. The epoxy 72 provides electrical insulation and mechanical protection for the coils 38. The epoxy 72 may be deposited on the coils 38 using a known technique such as spraying, dipping, or vapor deposition. The epoxy 72 covers the coils 38 on both axial sides of the stack 34 and also extends through the apertures 42. The covering of epoxy 72 may be combined with one or more of the above embodiments, such as the embodiments of FIGS. 4 and/or 5.

It should be understood that terms such as "axial" and "radial" are used above with reference to the normal operational attitude of a compressor. Further, these terms have been used herein for purposes of explanation, and should not be considered otherwise limiting. Terms such "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant compressor comprising:
an electric motor configured to rotationally drive an impeller via a shaft; and
a radial magnetic bearing assembly including a lamination stack and a plurality of coils arranged relative to the stack, and wherein an annular cover covers an axial face of the coils,
wherein the annular cover comprises:
a first leg configured to extend into a slot formed in the lamination stack, and
a second leg radially spaced-apart from the first leg and configured to extend axially into a coil aperture of the lamination stack, wherein the second leg is sized and shaped so as to prevent contact between adjacent coils within the coil aperture.

2. The refrigerant compressor as recited in claim 1, further comprising another annular cover covering an opposite axial face of the coils as the annular cover, and wherein the other annular cover is connected to free ends of the first and second legs.

3. A refrigerant compressor comprising:
an electric motor configured to rotationally drive an impeller via a shaft; and
a radial magnetic bearing assembly including a lamination stack having a plurality of apertures, and wherein an insert at least partially extends into a first one of the apertures to prevent direct contact between first and second coils within the first aperture,
wherein the insert includes a first leg extending into a slot formed in the lamination stack,
wherein the insert includes a second leg radially spaced-apart from the first leg,
wherein the second leg extends axially into the first aperture and is sized and shaped so as to prevent contact between the first and second coils within the first aperture,
wherein the first and second legs project from a first annular cover,
wherein the first annular cover radially overlaps a first axial end of the first and second coils,
wherein a second annular cover is connected to free ends of the first and second legs, and
wherein the second annular cover radially overlaps a second axial end of the first and second coils.

4. The refrigerant compressor as recited in claim 3, wherein the lamination stack is coated with an epoxy material.

5. A refrigerant compressor comprising:
an electric motor configured to rotationally drive an impeller via a shaft; and
a radial magnetic bearing assembly including a lamination stack coated with an insulative material,
wherein the lamination stack includes coil apertures extending axially between opposed axial faces of the lamination stack,
wherein a plurality of coils pass through the coil apertures between the opposed axial faces,
wherein an insert at least partially extends into a first coil aperture to prevent direct contact between first and second coils,
wherein the insert includes a first leg extending into a slot formed in the lamination stack,
wherein the slot is radially outward of the first coil aperture,
wherein the insert includes a second leg radially spaced-apart from the first leg, and
wherein the second leg extends axially into the first coil aperture and is sized and shaped so as to prevent direct contact between the first and second coils within the first coil aperture.

6. The refrigerant compressor as recited in claim 5, wherein the insert is made of an electrically insulative material.

7. The refrigerant compressor as recited in claim 5, wherein an annular cover is arranged against an axial face of the coils.

8. The refrigerant compressor as recited in claim 7, wherein the annular cover radially overlaps the coils.

9. The refrigerant compressor as recited in claim 8, wherein the annular cover includes the first and second legs.

10. The refrigerant compressor as recited in claim 9, further including another annular cover arranged against an opposite axial face of the coils as the annular cover, and wherein the other annular cover is connected to free ends of the first and second legs.

11. The refrigerant compressor as recited in claim 7, wherein the annular cover is made of an epoxy material.

12. The refrigerant compressor as recited in claim 5, wherein the coils are coated with an epoxy material.

13. The refrigerant compressor as recited in claim 5, wherein the insulative material is an epoxy material coating the lamination stack.

* * * * *